United States Patent Office 3,523,845
Patented Aug. 11, 1970

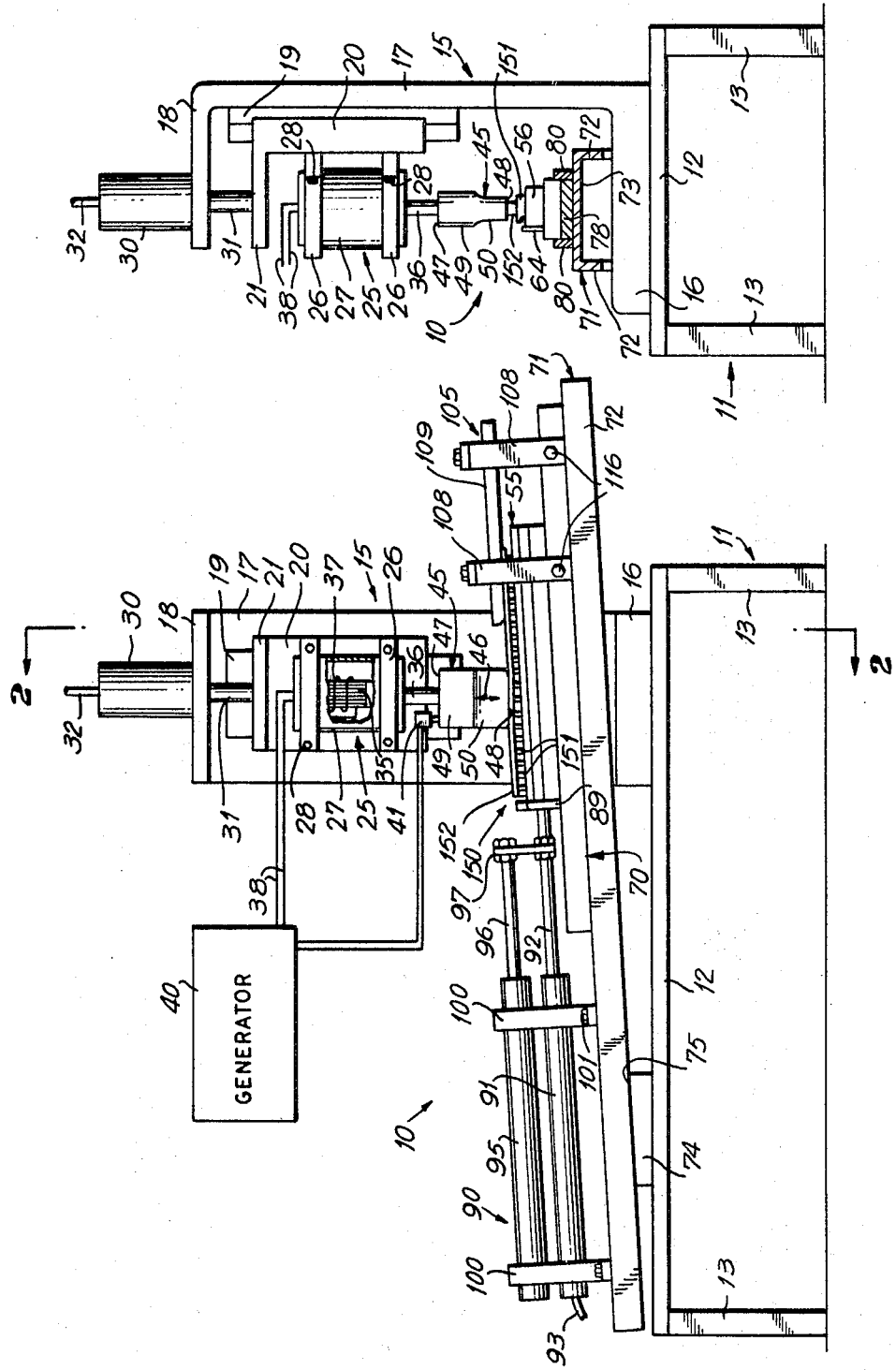

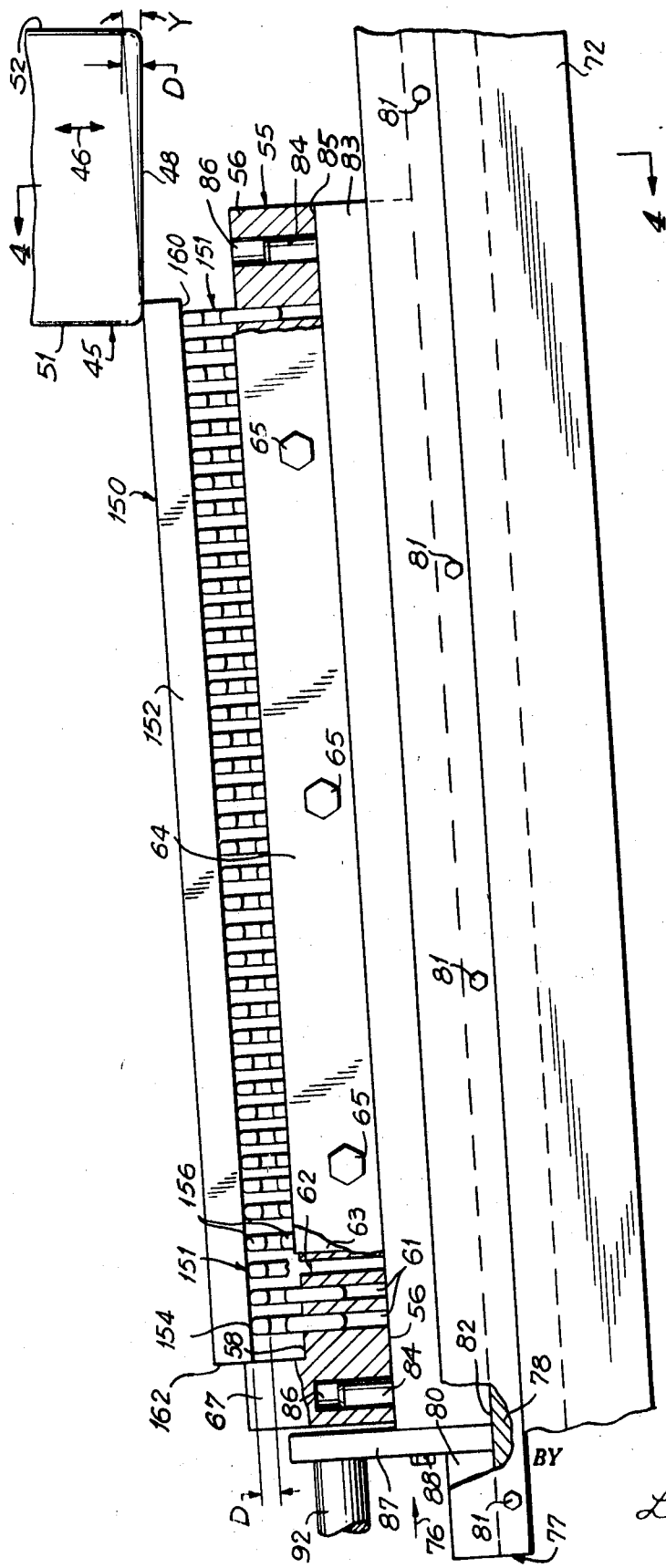

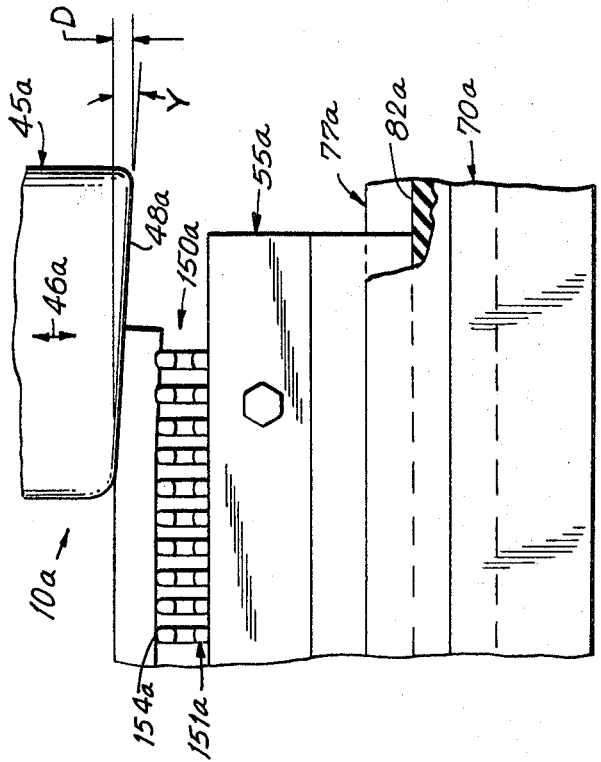
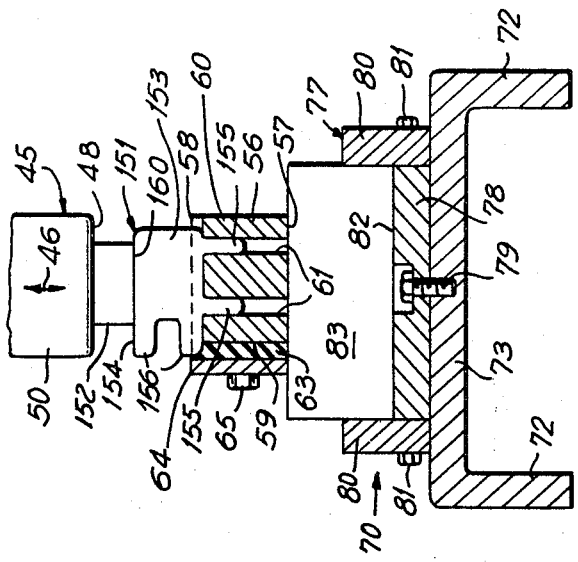

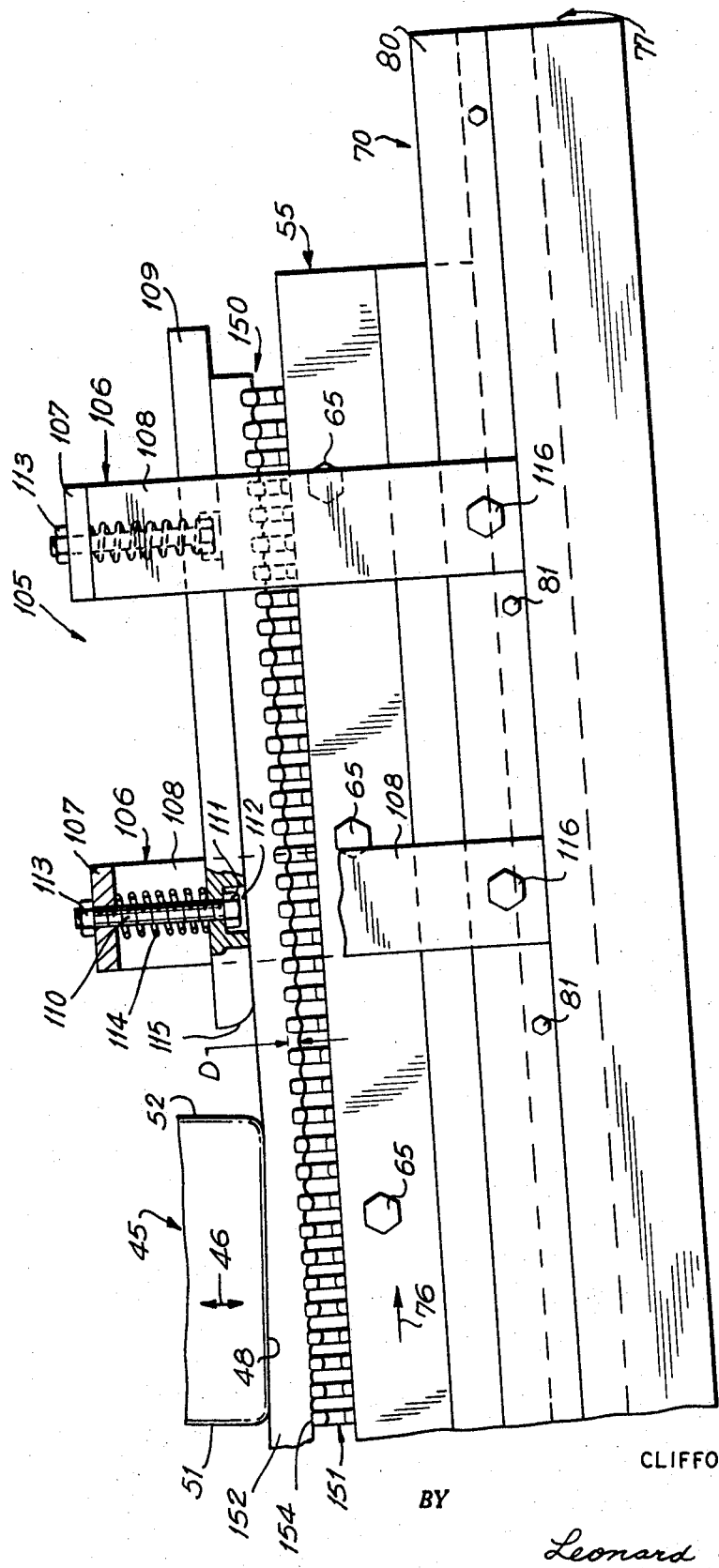

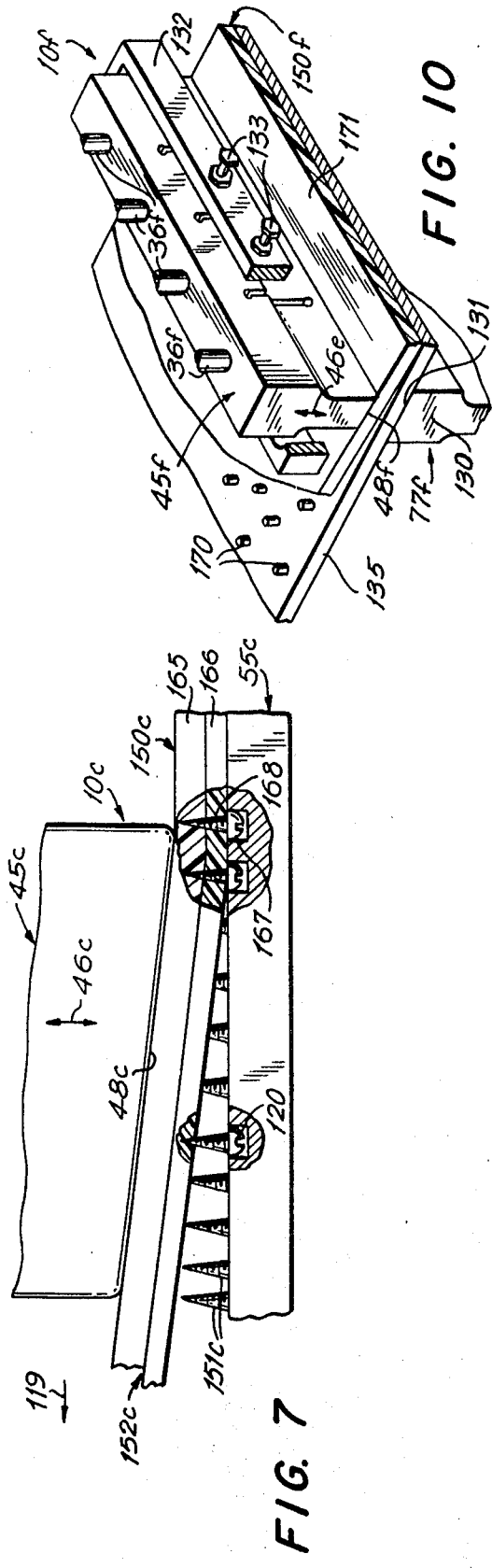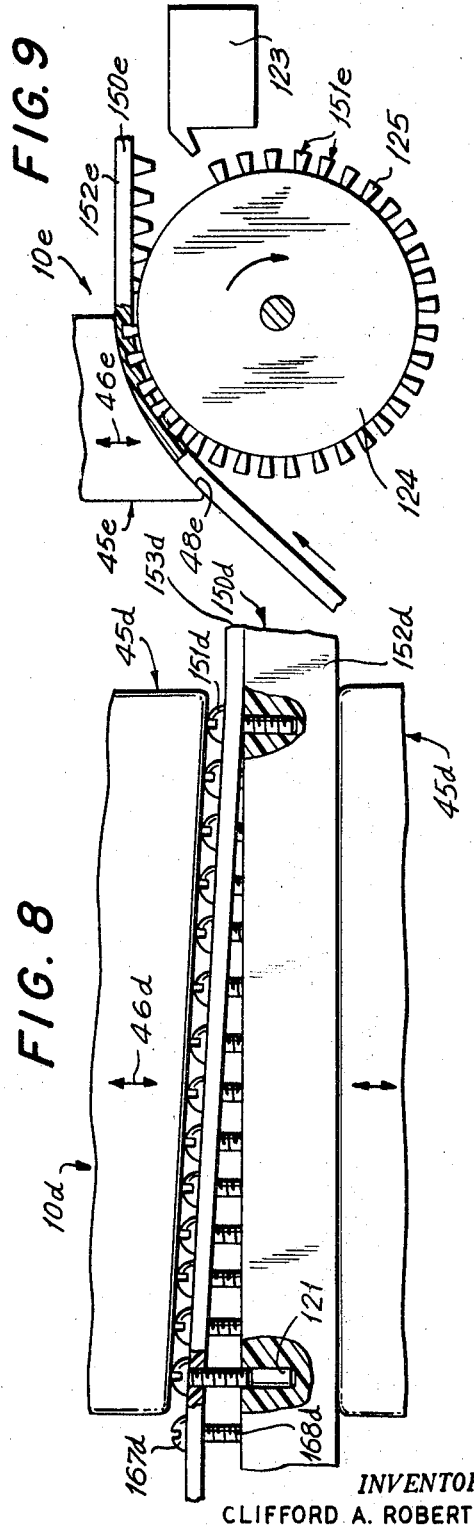

3,523,845
METHOD AND APPARATUS FOR JOINING A SERIES OF ELEMENTS TO A WORKPIECE BY ULTRASONIC ENERGY
Clifford A. Robertson, Bayshore, N.Y., assignor to Cavitron Corporation, Long Island City, N.Y., a corporation of New York
Filed June 27, 1966, Ser. No. 560,595
Int. Cl. B29c 27/08
U.S. Cl. 156—73                                   25 Claims

ABSTRACT OF THE DISCLOSURE

A method and apparatus for successively joining a series of elements to a workpiece to form a composite member with the use of ultrasonic energy. The elements and workpiece to be joined are moved in such a manner that the output surface of the ultrasonically vibrated member is in the form of an inclined plane so that at any one time only some of the elements in contact with the output surface require the maximum power which is necessary for the initial phase of an ultrasonic insertion process.

---

The present invention relates generally to the art of joining component parts and more particularly, relates to a novel method and apparatus for successively joining a series of elements to a workpiece to form a composite member.

In recent years an ultrasonic insertion process, as generally described in U.S. Pat. No. 3,184,353, entitled Fastening Together of Members by High Frequency Vibrations, which issued on May 18, 1965 and assigned to the assignee of the present invention, has been developed in which high frequency mechanical vibrations are employed in combination with a static force to insert one member, such as an element, into a receiving member, such as a workpiece. Although the above process is highly desirable and is being used in industry today, it was found that the problem of inserting a multiplicity or a series of parts, into a workpiece on a continuous basis and at production speeds required additional attention to make this new process applicable to a greater variety of industrial applications. In certain industrial processes, it is necessary to assemble a series of subtantially identical elements within a workpiece to obtain a finished product. In a modern and efficient process, the assembling of the various parts is accomplished semi-automatically or automatically by means of a machine that may operate at a high rate of speed with a minimum amount of manual labor, and towards this end this invention is primarily directed.

Heretofore, it has been the general practice to insert a series of elements into a workpiece by employing a vibratory member or tool, generally of a bar form, that may vary from several inches to several feet in length, and that would simultaneously overlap all of the elements being inserted within the workpiece. When a bar vibrator is employed, it is the general practice that the work parts, supported on an anvil, are stopped for a dwell period long enough to have the bar vibrator and workpiece moved in a plane perpendicular to each other so as to simultaneously apply the static force and vibratory energy to the overlapped parts. When this motion is employed the bar and work products are continually urged towards each other and the output surface of the vibrator is maintained in parallel spaced relation to the elements and workpiece to assure that the component parts are each respectively inserted the same distance into the workpiece. Although apparatus of this design is employed for various applications in which multiple insertions are required and dwell time does not economically affect production it does not lend itself for those applications where it is necessary to continuously insert successive elements in a workpiece at production speeds.

In addition, the power required for driving large bar vibrators is dependent upon the frequency of vibration, the mass of the vibrator, amplitude of vibration at which it is to be driven, and the energy requirements of the process as well as internal losses in the system. It is apparent that the cost of the power for a given system is not only the kilowatts per hour charge for electricity, but also the cost of the motor and generator. In various applications of ultrasonic energy, which have been shown to be sound technically, the cost of the motor and generator have made their use prohibitive. One of the advantages of using the methods and apparatus of this invention is that it is possible to perform ultrasonic operations requiring the insertion of a plurality of elements into a workpiece by generators and motors having reduced power outputs.

The present invention has for a primary object the provision of improved ultrasonic insertion methods and apparatus which avoid the shortcomings and disadvantages of techniques known heretofore.

An additional object of the invention is to provide improved methods and apparatus for multiple insertion of elements within a workpiece on a continuous basis.

Another object is to reduce the power consumption of insertion operations in which there are continuous transfers of energy from the output surface of the vibrator assembly to the composite member when the two are moving relative to each other.

Yet another object of the invention is to provide an improved technique and apparatus for the continuous insertion of elements within a workpiece for semi-automatic or automatic production assembly operations.

Still another object of this invention is to provide improved methods and apparatus operative to insert elements within a workpiece while the elements and workpiece are continuously advanced or moved past a vibratory surface.

A further object of the present invention is to provide novel insertion methods and apparatus wherein vibratory high frequency energy is employed over an area less than the total area of overlap between the parts forming the composite member and the composite member and vibratory surface are moved relative to each other along a predetermined path to sequentially and gradually insert one part within the other.

Apparatus employing sonic or ultrasonic energy for insertion of elements had already been developed by the present assignee, but those techniques were not practical in connection with the insertion of a plurality of elements in an elongated workpiece. By way of example, in the manufacture of terminal boards, a thermoplastic workpiece in the form of an elongated strip about 12.6 inches long, .38 inch wide, and .10 inch thick has inserted therein, at approximately every .20 inch, an element in the form of a terminal. The terminal extends across the width of the workpiece and approximately sixty terminals are inserted per workpiece. The depth of insertion is about .04 inch. Heretofore, in order to accomplish this assemblage by employing high frequency vibrations it was necessary to employ a bar vibrator having a length of about 13 inches to extend over the entire length of the terminal strip and simultaneously insert all sixty terminals.

A brief description of the presently understood theory of the ultrasonic insertion process will more clearly point out the new and novel contributions made by this invention. In seeking a solution to the problems presented by existing insertion systems, it was recognized that the insertion of a single element within a workpiece required a peak power supply and a continuous supply of power at a reduced level until the insertion was completed. Initially when the inserted element, which is generally of a metallic nature, is brought into engagement with the workpiece, generally of a plastic material, and the combined static force and vibratory energy is coupled thereto, there is an initial absorption of energy at the interface of the two parts until the surface of the plastic receiving part is softened to permit an initial penetration of one within the other. Thereafter, to continue the insertion, the energy and static force required to be employed, is substantially reduced since the initial insertion has commenced.

Thus, for example, we might initially require an initial surge of 30 watts for a given element until the upper surface initial underlying area of the plastic part is softened and the entrance of the metallic part therein begins. To continue this insertion we thereafter need reduced power, for example 10 watts of vibratory energy to continually insert the element until it reaches its desired lepth. By this simple example above it can easily be appreciated that if we use a vibratory member that simultaneously inserted sixty of these parts then the generator motor combination would be required to have a peak capacity of about 6,000 watts at one time at the vibratory operative surface.

In comparison to this the inventor has found that by feeding the composite member relative to the vibratory surface on an inclined plane arrangement, it is possible to have for a given length of a vibratory surface perhaps only three or four parts simultaneously at the initial stage of penetrating the surface of the plastic part and each necessitating the 30 watts of energy. The other elements in a continuous process have either been embedded within the workpiece or have slightly penetrated the workpiece and no longer require the initial 30 watt supply of energy but perhaps only the 10 watts to continue the insertion process. In addition out of sixty inserts, if we use a vibratory member having a three inch output surface only fifteen inserts are in overlapping relationship to the vibratory surface at one time and in energy transferring relationship to the vibratory surface. Of the fifteen perhaps four require the 30 watts at one time and the remainder 10 watts. Thus, a generator-transducer combination capable of delivering approximately 230 watts, not counting losses in the system, etc. is required. Again if the power is increased the time of the insertion is decreased.

It can therefore be seen that for a vibratory member of a given length employing the present process, it is possible to reduce the peak power capacity of a system by as much as a factor of 10 for the same arrangement of component parts. With the present invention, not only is it possible to reduce the power and in turn size of the ultrasonic motor and generator which results in direct cost saving to the consumer, but again we have a continuous operation in which there is no dwell time in which the workpiece must be stopped. Therefore we have an additional savings in time, since this invention is adaptable for continually moving the workpiece and associated parts relative to the vibratory device.

By way of illustration a series of tests were conducted to determine the insertion time required to insert varied numbers of elements or inserts with a specific power of 1000 watts. The apparatus employed was of the type previously described in which the component parts and vibratory member remained in fixed position with respect to each other, the following results were obtained.

| Number of inserts: | Insertion time, sec. |
|---|---|
| 3 | 1 |
| 6 | 1.6 |
| 12 | 2.0 |
| 18 | 4.0 |
| 23 | 5.0 |

When using the apparatus and method of the present invention, it was found that when using 500 watts of ultrasonic power and transporting the inserts past the active vibratory member the time of insertion was reduced considerably as noted.

| Number of inserts: | Insertion time, sec. |
|---|---|
| 3 | .3 |
| 6 | .6 |
| 12 | 1.2 |
| 18 | 1.8 |
| 23 | 2.3 |

The time to insert 60 elements as herein illustrated was aproximately six seconds with a 500 watt generator-transducer combination.

However, by providing the inclined plane in accordance with the present invention, the amount of inserts in contact with the tool when the plastic is still in a solid state is limited to from two to five dependent on the angle of the element support. Once a melt takes place at the interface, the loading characteristics are less, with the result that higher mechanical motions are maintained as the next series of inserts are moved past the ultrasonic vibrator.

Briefly, in carrying out the method of the present invention, a high frequency vibratory surface of extended length is employed to sequentially and gradually insert a plurality of elements within a workpiece, the length of the vibratory surface being less than the length of the workpiece, to form a composite member. The elements and workpiece are supported in overlapping relationship to each other and the parts of the composite member are maintained in a fixed position with respect to each other to prevent any slippage between the parts. The composite member and vibratory surface are moved relative to each other along a predetermined path, which generally defines an inclined plane with reference to the vibratory surface. One part of the composite member, generally the workpiece, is brought into energy transferring relationship with the vibratory surface, i.e. direct engagement, as the composite member moves relative to the vibratory surface along this predetermined path which is in angular spaced relationship to the vibratory surface, to form a continually changing spacing of decreasing dimension between respective portions of the vibratory surface and composite member. By gradually decreasing the spacing or opening through which the element and workpiece must pass, which spacing is smaller than the thickness of the workpiece and extended portion of the element adapted to be inserted in the workpiece, and simultaneously inducing vibrations in the vibratory surface with a substantial component of motion normal to the surface, while a static force is also simultaneously applied to the other part, the elements are sequentially and gradually inserted within the workpiece. The static force is applied in a direction to urge the overlapping parts against the vibrating surface as the relative lateral movement between the two is maintained. The depth of penetration is controlled by proper angular alignment of the vibratory surface and a support which guides the movement of the overlapping parts along the predetermined path.

In its essential aspects, the apparatus of the present invention includes a vibratory assembly which employs a transducer unit with a biased alternating current to vibrate the transducer at high frequency and relatively small amplitude. A vibratory member having a vibratory or operative surface of extended length, to overlap a plurality of elements at one time, for engagement with the parts along their area of overlap is rigidly secured by a connecting body to one end of the transducer.

A plurality of elements are supported by carrier means in spaced relationship to each other with one end of the elements adapted to be inserted in the workpiece held in overlapping relationship thereto. Means for supporting the carrier are provided with drive means for moving the composite member relative to the vibrating surface of the vibrator assembly. The static force to urge the component parts against the vibratory surface is generally provided by maintaining the vibratory assembly and support for the carrier in fixed relationship to each other so that an inclined plane therebetween is formed.

The term "ultrasonic" as used herein is intended to include acoustic vibrations, for example, at a frequency in the range between approximately 1 kc./sec. and 100 kc./sec. The operating frequency may be in the higher sonic or ultrasonic ranges, preferably in the range between approximately 15 kc./sec. and 30 kc./sec.

Although the characteristic features of this invention will be particularly pointed out in the claims, the invention itself, and the manner in which it may be made and used, may be better understood by referring to the following description taken in connection with the accompanying drawings forming a part thereof, in which:

FIG. 1 is a front view of an ultrasonic insertion machine embodying the present invention;

FIG. 2 is a side view of the ultrasonic insertion machine of FIG. 1 taken along the line 2—2 of FIG. 1;

FIG. 3 is an enlarged front view, partly in section, of the carrier for supporting the elements in relation to the vibrator and carriage assemblies in the machine of FIGS. 1 and 2;

FIG. 4 is a side view taken along the line 4—4 on FIG. 3;

FIG. 5 is an enlarged front view, partly in section, of the carrier for supporting the elements in relation to the vibrator and vibration damping assemblies in the machine of FIGS. 1 and 2;

FIG. 6 is a fragmentary front view showing a modification of obtaining the angular displacement between the vibratory surface and the elements;

FIG. 7 is a fragmentary front view similar to that of FIG. 6, but showing another embodiment of the invention wherein the composite member is in a fixed position and the vibratory surface moved relative thereto;

FIG. 8 is a fragmentary front view similar to that of FIG. 7 but showing another embodiment of the invention;

FIG. 9 is a fragmentary front view showing a further embodiment of the invention wherein the carrier for the elements is of a circular configuration; and FIG. 10 is a fragmentary view of another embodiment of the invention wherein the extended length of the vibratory surface is in a plane transverse to the direction of motion of the composite member.

Similar reference characters refer to similar parts throughout the several views of the drawings and the specification.

GENERAL DESCRIPTION

Referring to the drawings in detail and initially to FIGS. 1-5 thereof, it will be seen that ultrasonic apparatus in accordance with the present invention is illustrated in the fabrication of component parts to form a composite member 150, one part of which may be comprised of a plurality of non-plastic elements 151 generally of a metallic material, and another part or receiving workpiece 152 of generally a plastic, preferably thermoplastic material, the relationship between the parts to be hereinafter discussed in detail. Although the parts 151 and 152 are represented or illustrated as being of a metallic and plastic material respectively, it is to be understood that the parts being joined or secured together in accordance with the present invention may both be of a material other than metal, such as wood, plastic, glass, ceramics or the like, or such members may be of different materials such as metal. In addition both parts may be of the same or different metallic materials.

In other words, while most of this disclosure describes the insertion of a plurality of metallic elements into a plastic-like workpiece, the invention disclosed herein is applicable to any type of ultrasonic insertion process. In addition to this invention being applicable to U.S. Pat. No. 3,184,353, as discussed above, it is similarly applicable to U.S. Pat. No. 3,224,086 entitled, "Method of High Frequency Vibration Fitting," which issued on Dec. 21, 1965, and is assigned to the assignee of the present invention. This patent is concerned with the inserting of one metallic member into another. The main distinction in inserting a metallic member into a metallic member, is that it would probably be necessary to have a preformed recess in the metallic workpiece to receive a metallic element. Such a preformed recess is not an absolute necessity when the workpiece is plastic in nature. Nevertheless, in the case of a plastic workpiece, a preformed recess may be desirable to avoid any excess material or flash at the completion of the assembly process.

With reference to FIGS. 1 and 2, it will be seen that the apparatus embodying the present invention and generally identified by the reference numeral 10 may include, a platform 11 on which a vibrator support assembly or stand 15 is situated and has mounted thereon a vibrator assembly 25. The latter assembly includes a vibratory member or tool 45 whose vibratory or output surface 48 is positioned substantially in a horizontal plane and adapted to engage the workpiece 152 during the insertion cycle. The elements 151 are supported in a carrier assembly 55 and the workpiece 152 is maintained in overlapping relation thereto. The carrier assembly 55 is in turn positioned on a carriage assembly 70 which is driven by drive assembly 90 along a predetermined path past the vibratory member 45 and simultaneously urges one of the overlapping parts into continuous engagement with the output surface 48 while continuous static forces are applied in a direction substantially normal to the vibratory surface so as to sequentially and gradually insert the elements 151 within the workpiece 152. A vibration damping assembly 105 is positioned to the rear of the vibrator assembly 25 and clamps the composite member immediately after it is formed to dampen out any residual vibrations.

THE VIBRATOR AND VIBRATOR SUPPORT ASSEMBLIES

With reference to FIGS. 1 and 2 thereof, it will be seen that in one embodiment of the ultrasonic insertion apparatus 10 embodying the present invention a platform structure 11 having a horizontally extending support 12 and a plurality of supporting legs 13 extending therefrom is provided to support the various integrated operating components of the apparatus of this invention.

The vibrator support assembly in the form of a support stand 15 is provided for maintaining the vibrator assembly 25 in proper position and may include a base 16 with an upright wall 17 extending upwardly from one end of said base and a head 18 extending from the upright wall 17 and in overlapping relationship to the base 16. Mounted on the upright wall 17 is a mounting channel 19 which engages a support block 20 which is slidably connected by a dovetail connection (not shown) to the mounting member 19 to permit vertical movement of the vibrator assembly 25 between the base 16 and head 18 of the support stand 15. The vibrator assembly 25 is suitably secured to the support block 20, for example, by means of bands 26 which encompass the casing 27 of the vibrator assembly and are secured to the support block 20 by means of bolts 28.

Means to effect vertical movement of the vibrator assembly 25 is provided and may be in the form of a cylinder 30 vertically mounted to the head 18 and having a shaft 31 extending therefrom and through the head 18 and coupled to the horizontal flange 21 of the support block 20 in any conventional manner. The air cylinder 30 may be operated by supplying compressed air conveyed by a conduit 32 from an exterior source (not shown) and extended from the rear of the cylinder. The exact height of adjustment is generally determined prior to the commencement of the insertion cycle and will determine the depth of insertion for a given angular displacement and tool length.

The mechanical vibrator assembly 25 includes a transducer 35 which may be any one of a number of electromechanical types, such as, electro-dynamic, piezoelectric or magnetostrictive. The operating frequency may be in the sonic or ultrasonic range between approximately 1 kc./sec. to 100 kc./sec. but preferably in the range from 15 kc./sec. to 30 kc./sec. The vibrator assembly 25 is preferably of the type generally disclosed in U.S. Letters Patent No. Re. 25,033 issued Aug. 29, 1961. The transducer 35 housed within the casing 27 may be cooled as by water or air.

The vibrator assembly 25, as diagrammatically shown, generally includes a driver unit made up of the transducer 35 of mechanical vibrations and an acoustic impedance transformer or connecting body 36. The transducer 35 of mechanical vibrations may comprise a stack of laminations of magnetostrictive material, for example, nickel, and a diagrammatically illustrated winding 37 adapted to carry a biased, high frequency alternating energizing current. The lower ends of the laminations making up the stack of the transducer 35 are fixedly secured, as by welding or soldering, to the upper end of the transformer 36. The transformer 36 has an enlarged section (not shown) in the general area of a nodal plane of motion, and this section constitutes a flange secured to the casing 27.

A biased, high frequency alternating current is supplied to winding 37 through conductors 38 extending from a suitable oscillation generator 40, which may be of the type disclosed at p. 270 of "Ultrasonic Engineering," by Alan E. Crawford, published 1955 by Butterworths Scientific Publications, London. An oscillation generator of this type is effective to supply a biased alternating current to the winding 37 at a resonant frequency of the driver unit of transducer 35 and is further effective to vary the frequency of the supplied biased, alternating current when the resonant frequency of the driver unit is varied due to changes in temperature, or changes in the loading thereof. Although the frequency of the supplied biased, alternating current is adjusted, in the oscillation generator disclosed in the above identified publication, in response to a feedback signal from a capacitor type pick-up connected to the transducer, it is to be understood that other types of pick-ups may be employed, for example, a magnetostrictive pick-up 41 providing an output signal varying with the amplitude and frequency of the vibrations, and being fed back by the generator. Other existing types of oscillation generators may also be employed, for example, as disclosed in U.S. Letters Patent No. 2,872,578, in which adjustment of the frequency of the alternating current supplied by the oscillation generator is obtained through the use of a feedback signal which varies with the impedance of the transducer.

The lower or output end of transformer 36 is coupled to the vibratory or vibration transmitting member 45 so that when the vibrator assembly 25 is operated by electrical oscillations supplied from generator 40, compressional waves are generated in the stack of laminations 35, the transformer 36 and transmission member 45, so as to cause vibrational movements in the vertical direction, that is along the longitudinal axis of the transducer. For the purposes of the present invention, such vibrations preferably have a frequency in the range between approximately 1000 cycles per second and 100,000 cycles per second, and are of sizable amplitude, for example, in the range between approximately .001 and .01 inch. In order to ensure that the maximum amplitude of vibration in the vertical direction is obtained at the lower end or vibratory surface 48 of the vibratory member 45, as indicated by the double headed arrow 46, thus ensuring the maximum transmission of working energy, the overall length of the stack of magnetostrictive laminations 35 and the transformer 36, that is, the driver unit of vibratory assembly 25, and of the vibratory member 45 is selected so that, at the frequency of the electrical oscillations supplied to winding 37 of the transducer, a loop of longitudinal motion of the generated compressional waves occurs at or near the output surface 48 of vibratory member 45. In other words, the overall length of the driver unit or transducer 35 and transformer 36 is approximately equal to an integral number of one-half wavelengths of the sound waves generated in the particular materials comprising the stack of laminations 35, the transformer 36 and the vibratory member 45 at the working frequency.

The vibratory member 45 has an input surface 47 which is mechanically coupled to the transformer 36 and an output surface or vibratory surface 48 which is maintained in energy transferring relationship with one of the overlapped parts during the insertion process. The vibratory energy may be transmitted to the component part by direct contact or through an intermediary tool which acts to transmit the vibration and assure that the vibratory surface 48 is an energy transfering relationship to the composite member. The configuration of the vibratory member between its input and output surfaces 47 and 48, respectively, may vary in form but is generally designed to increase the amplitude of mechanical vibrations at the output surface. As seen in FIG. 2, the vibratory member has an input portion 49 of larger cross section than the output portion 50 in accordance with the above referenced Pat. No. Re. 25,033 which explains in detail the principles of amplitude magnification.

THE CARRIER ASSEMBLY

With continued reference to FIGS. 1 and 2 and more particularly with respect to FIGS. 3-5 it will be seen that the carrier assembly 55 is provided for supporting the elements 151 in fixed spaced relationship to each other with one end thereof adapted to be inserted within the workpiece 152 to form the composite member 150.

The elements employed in the present invention may have any number of configurations and as seen best in FIG. 4 one form may be that of a terminal lug having a body portion 153 with an upper edge or surface 154 and a pair of legs 155 extending from the opposite side thereof and a pair of prongs 156 extending from one end of said body portion. In actual tests conducted, terminal lugs of the illustrated configuration had a width of about .025 inch and an overall rectangular size including the legs and prongs of about .26 x .60 inch and were inserted about .04 inch into the workpiece 152, the latter being in the form of a terminal strip about 12.6 inches in length, .38 inch wide, and .10 inch thick.

The carrier assembly 55 includes a base 56 for supporting the elements 151 in spaced relationship to each other and wherein the upper surfaces 154 thereof are maintained in a substantially flat plane. A series of equally spaced apart pairs of apertures 61 are provided that extend between the lower face 57 and upper face 58 of the carrier base 56 and in a plane substantially perpendicular to the front side wall 59 and a rear side wall 60. Slots 62 (FIG. 3) are provided that extend transversely across the upper face 58 to connect each pair of apertures 61 respectively to provide a seat which accepts a portion of the element 151 therein. The diameter of the apertures are large enough to accept the legs 155 of the element 151 therein. In this manner elements 151 are retained in parallel spaced relationship to each other by the series of apertures 61 which extend through the carrier 56, and the slots 62. As seen in FIGS. 3 and 4 the upper surfaces 154 of the elements 151 form a substantially flat surface and the workpiece 152 is positioned in overlapping relationship so that its lower surface 160 engages the upper surface 154 of the elements.

To retain the elements 151 in position during their insertion within the workpiece 152 a retainer 63 is placed against the front side wall 59 and is maintained in position by means of a cover plate 64 which is secured by bolts 65 to the carrier base 56. The retainer 63 is preferably of a compressible material, for example, rubber, which will engage a portion of the elements 151, for example one of the prongs 156, to aid in maintaining it in a fixed position.

Means to prevent slippage between the parts of the composite member 150 may be provided in the form of a shoulder 67 (see FIG. 3) protruding from one end of the carrier body 56 and having a height adapted to engage the end 162 of the workpiece 152 to prevent movement between the component parts during their assemblage.

THE CARRIAGE AND DRIVE ASSEMBLIES

The carriage assembly 70 and drive assembly 90 are mounted on a support member 71 (see FIG. 1) whose cross-section is in the form of a U-shaped channel presenting side flanges 72 (see FIG. 4) joined by a connecting web 73. The channel 71 is the main support member for the drive assembly 90, and carrier support assembly 70, which in turn supports the vibration damping assembly 105, the interrelationship of which in conjunction with the vibrator assembly 25 is to be hereinafter discussed in detail. The channel 71 is itself supported at substantially one end by the base 16 of the vibrator support assembly 15 and at substantially the other end by a block 74 (FIG. 1) having an upper inclined surface 75. The upper surface 75 of the block 74 is angularly disposed with respect to the output surface 48 of the vibratory member 45 to provide the required inclined plane required to continually compress the overlapping component parts towards each other during the insertion cycle.

The carriage assembly 70 illustrated in FIGS. 1–4 is mounted to be traversed along a predetermined path of travel which is along a plane in angular spaced relationship to the vibratory surface 48. The carriage assembly 70 is traversed a specific selectable distance depending on the length of the component parts to be joined. Since a 12.6 inch workpiece has been selected for illustrative purposes, the travel of the carriage will be approximately that distance on its forward and return strokes. The insertion of all the elements 151 within the workpiece 152 is accomplished on the forward stroke in the direction of arrow 76 (FIG. 3) and on the return stroke the carriage assembly is returned to its original position for removal on the composite member 150 therefrom.

The carriage assembly 70 consists of back-up means or frame 77 (FIGS. 3 and 4) having a bed 78 secured to the connecting web 73 of the support member 71 as by bolts 79 with a pair of side walls 80 secured to the bed 78 as by bolts 81 to form a track for linear slidable movement of the carriage body 83 which sits within the track formed by the carriage frame 77. The back-up surface 82 of the bed 78, at least in part, confronts the vibratory surface 48 to form an inclined plane with respect to said vibratory surface which together provide the predetermined path of travel for the composite member 150, carrier assembly 55 and carriage body 83. By maintaining the back-up means 77 and vibratory surface 48 in fixed position with respect to each other, we essentially have an opening of continually changing spacing of decreasing dimension in a direction substantially normal to the path of travel, in the direction of arrow 76, to continually force and compress the overlapping component parts against each other.

A pair of vertically extending pins 84 protrude from the top 85 of the carriage body 83 which mate with corresponding apertures 86 in the carrier base 56 for retaining the latter in position. An end plate 87 is secured to the end of the carriage body 83 as by bolt 88 (see FIG. 3) and which end plate is linked to the drive assembly 90.

The drive assembly 90 as seen in FIG. 1 is provided for effecting lateral movement of the carriage and carrier assemblies 70 and 55, respectively along the predetermined path past the vibratory surface 48. The drive assembly 90 may consist of a cylinder 91 having a piston rod 92 extending therefrom and connected to the end plate 89. The piston rod 92 is connected to a piston moveable within cylinder 91. A source of compressed air (not shown) is coupled through a supply conduit 93 to the cylinder 91. A second cylinder 95 has a piston rod 96 extending therefrom and is fixed by coupling bracket 97 to the piston rod 92. The second cylinder has a hydraulic fluid contained therein and acts as a hydro-check to guarantee controlled linear movement of the piston rod 92 of carriage cylinder 91 and in turn carriage assembly 70 relative to the vibratory member 45. The cylinders are fixed in place by mounting brackets 100 which are mounted by bolts 101 to the support member 71.

VIBRATION DAMPING ASSEMBLY

As illustrated in FIG. 5 the vibration damping assembly 105 is provided to remove any vibrations set up in the composite member 150 as it moves past the vibratory member 45 and has high frequency mechanical energy transmitted thereto. Essentially the vibration damping assembly 105 applies a static force against the carrier assembly 55.

The vibration damping assembly 105 is comprised of a pair of U-shaped brackets 106 having an upper bar 107 and a pair of side bars 108 extending therefrom and overlapping the sidewalls 80 of the carriage frame 77. Bolts 116 secure the side bars 108 to the side walls 80 of the carriage frame 77. Suspended from the cross bar 107 is a substantially horizontally mounted shoe 109 that has a curved forward edge 115 to initially engage the workpiece 152 of the composite member. A pair of spaced apart apertures extend through the shoe 109 with counterbore 112 to seat the head 111 of bolt 110 that extends through the shoe 109, and cross bar 107 with a nut 113 on the outer side thereof to retain it in place. The bolt 110 extends through a compression spring 114 which is selected to apply a predetermined static force to the shoe 109 in the direction substantially normal to the path of travel of the composite member 150 and wherein a static force dampens out any vibrations created during the insertion cycle.

It has also been found that for certain applications wherein the workpiece 152 has a thickness in the plane normal to the path of movement of sufficient magnitude then the vibration damping assembly may be dispensed with.

OPERATION

To commence the insertion operation the elements are automatically or manually loaded onto the carrier assembly 55 and the workpiece 152 placed in overlaping relationship thereto to form an area of overlap. The carrier assembly 55 is mounted on the carriage assembly 70 and both will move together along the predetermined path when driven by the drive assembly 90.

The predetermined path is designed to provide an inclined plane between the vibratory surface 48 of the vibrator member 45 and the upper surfaces 154 of the elements 151. This path permits relative lateral movement between the composite member 150 and vibratory surface 48 to form a continually changing spacing of decreasing dimension between respective portions of the vibratory surface 48 and composite member 150 in a direction substantially normal to said path of travel.

As seen in FIGS. 3 and 6 the path is defined by an angle Y which is directly related to the length of the vibratory surface 48 along said path of travel. The angle Y taken together with the length of the vibratory surface determines the depth of insertion D of the elements 151 within the workpiece 152.

For most applications the angle Y will not exceed sixty degrees. In the apparatus for forming the composite member 150 herein illustrated, the angle Y was approximately two degrees for an output surface 48 of 3.2 inches in length. Once the depth of insertion D is known, a vibratory member 45 may be selected having an output surface 48 whose length in the direction of the path of travel may overlap several elements. With this dimension known the angle Y may be calculated and a block 74 having an inclined surface 75 of proper angle selected.

The vibrator assembly 25 is vertically adjusted by means of the cylinder drive 30 to the position seen in FIG. 5, wherein the spacing between the upper surface 154 of the elements 151 and the vibratory surface 48 continually decreases between the forward edge 51 and rear edge 52 of the vibrator 45. Although the angle Y may be obtained in various ways in accordance with the various embodiments of the present invention, one manner, as illustrated in FIGS. 1–5, is when the components of the carriage assembly are maintained parallel to the back-up surface 82 of the carriage assembly. Additionally the carriage body is also maintained in parallel spaced relationship to the vibratory surface 48. In the operation as illustrated in FIGS. 3 and 5 it is seen that the elements 151 mounted on the carrier base 56 are moved relative to the vibratory surface 48 along the predetermined path. The vibratory member 45 is maintained in energy transferring relationship to one part of the composite member and in this embodiment it is the workpiece 152. A static force is applied to the opposite composite member namely, the elements 151 to urge the overlapping parts against the vibrating surface 48. The relative movement while the vibratory surface is vibrating will cause a transmission of vibratory energy to the interface of the composite members and permit the gradual insertion of one part within the other.

This static force is generally obtained by maintaining the back-up surface 82 of the carriage frame 77 in fixed angular spaced relationship to the vibratory surface 48 to creat a wedge or inclined plane wherein the gap or spacing in the vertical plane at the forward edge 51 of vibratory member 45 is less than the spacing between the back-up surface 82 and the rear edge 52 of the vibratory member 45.

As seen in FIG. 5 the vibratory surface 48 is mounted in a fixed position while it is vibrating and the carriage assembly 70 is moved along a predetermined path in the direction of the arrow 76. By feeding the parts past said vibratory surface we effect the sequential and gradual insertion of the elements within said workpiece. As seen in FIG. 5 as the insertion cycle progresses two or three elements on the left are at the stage of initial penetration within the workpiece 152 and the remaining elements are further progressed until they exit from beneath the vibratory surface at which time they have reached the depth of penetration, D. As the composite member is formed and extends past the rear of the vibratory member 45 it engages the shoe 109 of the vibration damping assembly 105.

The vibrations at the surface 48, as generally indicated by the arrow 46, provide high velocity amplitudes or accelerations, for example, of the order 1000 g, and such high velocity amplitudes or accelerations ensure that the confronting surfaces of the vibratory member and workpiece are separated during each portion of the cycle, notwithstanding the static or clamping pressure, thereby to reduce the frictional resistance of the composite member and vibrator as they move relative to each other.

The shoe 109 which is spring biased in a downward direction clamps the composite member 150 against the carrier base 56 to effectively eliminate any residual vibrations that might be setup during insertion. As seen in FIG. 5 by maintaining the proper angular displacement the depth of penetration D is obtained along the entire length of composite member 150.

After the carriage assembly 70 has reached its forward position the vibratory assembly 25 is raised to permit clearance of the composite member on its return movement. The drive assembly 90 is energized to reestablish relative movement between the vibratory surface 48 and the carriage assembly 70 until the latter reaches its initial position and the composite member 150 may be removed.

FIG. 6 illustrates another form 10a of the present invention which may be essentially similar to that of FIGS. 1–5 except that the angular displacement or inclined plane between the vibratory surface 48a of the vibrator assembly and the carrier assembly 55a, or more particularly the upper surface 154a of the elements 151a, is obtained by maintaining the back-up surface 82a of the carriage back-up means 77a in a horizontal plane and angularly disposing the vibratory surface 48a thereto. Thus, the elements 151a and workpiece 152a are positioned in overlapping relationship to each other in a similar manner as discussed with respect to the embodiment illustrated in FIGS. 1–5 except that the carrier 55a is maintained in a horizontal plane, for example, by making the support block 74 (FIG. 1) the same height as the base 16 of the vibrator support assembly. When this is done the output surface 48a of the vibratory member 45a is either tapered or the entire vibrator assembly is displaced by the angle Y which is calibrated to give a depth of penetration D.

In this form of the invention, the carriage assembly 70a and vibratory member 45a are moved relative to each other along a predetermined path and as this movement progresses the elements 151a are sequentially and gradually inserted within the workpiece 152a to form the composite member 150a.

This form of the invention might be employed on apparatus wherein various component members having different depths of penetrations etc. are required. In this manner only the vibratory member 45a need be changed and the support assembly left remaining in a horizontal plane.

FIG. 7 illustrates another embodiment of the invention 10c wherein a composite member 150c is formed of a plurality of elements 151c, that may be in the form of tapered screws and the workpiece for receiving the elements may be comprised of two overlapping strips of material 165 and 166, respectively. In addition the workpieces 165 and 166 may be of extended length and may initially be brought together in overlapping relationship beneath the vibratory surface 48c of the vibrating member 45c.

The carrier 55c s suppled with a series of spaced apart recesses 120 which house and support a portion of the screws 151c as for example the heads 167, the bodies 168 thereof extending from the carrier 55c and adapted to be substantially inserted with the overlapping strips 165 and 166 which form the workpiece 150c.

In this embodiment the carrier 55c may be maintained in a horizontal plane and the vibratory surface 48c maintained in fixed angular spaced relation thereto. To obtain the insertion, the relative linear movement is obtained by maintaining the composite member 150c in a fixed position and moving the vibratory surface 48c along the predetermined path, as indicated by arrow 119, to effect the sequential and gradual insertion of the elements 151c within the workpiece 152c.

FIG. 8 illustrates another embodiment of the invention 10d which essentially employs the same principles as heretofore disclosed except that the composite member 150d is formed from a series of elements 151d which may be in the form of screws, a strip 153d having a series of preformed apertures therethrough and a receiving member 152d, which is provided with a series of preformed recesses 121 to partially accept the body 168d of the screws. The carrier in this embodiment of the invention may be considered to be the strip 153d and/or the receiving member 152d. As is desirable in certain applications a preformed recess 121 is provided in the workpiece 152d which is in coaxial alignment with the axis of the screws 151d. The purpose of the recess is to avoid undue displacement of material in surrounding relationship to the head 167d of the screw 151d when the latter is in its seated position. The vibratory surface of the vibratory member is seen to extend over a plurality of screws 151d at one time so as to progressively and continuously insert them within the workpiece.

If desired the strip 153d which may act only as the carrier in this embodiment of the invention might be of a pliable material wherein it snaps off over the heads 167d of the screws after the latter have been inserted to their desired depth.

Although the prior embodiments have generally illustrated that the vibratory surface is maintained in energy transferring relationship, by direct contact, generally with the workpiece, it is seen in FIG. 8 that vibratory energy may be coupled to the elements 151d for transmission to the interface of the component parts. For certain applications, it may also be desirable to introduce the vibratory energy directly to both component parts and in which case a second vibratory member 45d may be employed to transmit the vibratory energy and apply the static force to the other component part for example the workpiece.

FIG. 9 illustrates another embodiment of the invention 10e wherein it is desired to continuously insert elements 151e within a workpiece 152e, the latter may be of an extended length. In accordance with this embodiment a hopper 123 is provided to continuously feed the insert elements onto a carrier 124, having a circular configuration, and continuously rotated in any conventional manner (not shown). The carrier 124 is adapted to receive and retain a plurality of elements 151e extending from its periphery 125. The carrier 124 is rotated as to have a linear speed at its periphery 125 equal to the linear speed of the workpiece. The vibratory member 45e has a contoured output surface 48e which forms the plane of continuously decreasing dimension between respective portions of the elements 151e and said vibratory surface. As seen in the FIG. 9 the elements are continuously and gradually inserted within the workpiece, by rotating the carrier 124 and as the workpiece and elements pass the stationary vibratory surface they are joined together to form the composite member 150e.

FIG. 10 illustrates another embodiment of the invention 10f which comprises a stationary back-up means 77f in the form of an anvil 130 with a back-up surface 131 and a vibratory member 45f supported within a rectangular frame 132. The vibratory member is preferably made of a metal and it is physically held within the frame 132 by a plurality of set screws 133 threaded through the frame 132 to engage the vibratory member 45f.

The vibratory member 45f is set into ultrasonic vibration by a plurality of vibrator assemblies which is shown coupled via its connecting body 36f to the vibratory member. This arrangement of supporting and driving an elongated vibratory member is discussed in U.S. Pat. 3,113,225. The output surface 48f of the vibratory member is maintained in fixed spaced relationship to the back-up surface 131 to provide a path of travel through which the composite member 150f may pass. The composite member 150f is comprised of a plurality of elements 170 which may in the form of terminals as in a printed circuit board for insertion into a workpiece 171, which may be a printed circuit board. The carrier 135 is provided to support the elements 170 in spaced relationship to each other.

The vibratory surface 48f is angularly disposed with respect to the back-up surface 131, as by tapering the surface 48f to provide the continually changing spacing to apply a static force to the overlapped component parts as they are moved relative to the vibratory member 45f. As seen in FIG. 10 the extended length of the vibratory surface is positioned transverse to the plane of movement of the composite member. This is desirable for those applications having a large rectangular area wherein the size of the output surface would otherwise require generator-transducer combinations of tremendous power outputs.

Although the elements herein are illustrated to comprise a plurality of independent members they may also comprise contiguous segments of a single elongated member. Thus the carrier 135 and elements 170 may be of a single structure wherein the elements 170 form contiguous segments of the member 135. The element may also be a member of extended length inserted within a workpiece of extended length.

From the above, it will be apparent that each ultrasonic assembly procedure and apparatus embodying this invention employs a vibrated member which may have a flat operative surface for introducing elastic vibratory energy into one part of the overlapping component parts subjected to a static or clamping pressure between such operative surface of the vibratory member and back-up means. The spacing between the operative surface and the back-up means is of continually changing spacing of decreasing dimension so as to gradually and sequentially insert the elements into the workpiece as the composite and vibratory members are moved relative to each other. Since the composite member is angularly disposed to the vibratory surface for insertion of the elements into the workpiece, the insertion is gradual and only a few elements at one time are in the initial stages of insertion which requires the peak amount of power. The other elements are either partially inserted or have not been subjected to the static force and high frequency vibrations. In this manner, an elongated vibratory member having a length substantially less than the composite member may be employed for assembly operations that prior to this invention were uneconomical and unfeasible with ultrasonic energy.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A method of inserting elements into the preformed recesses of a workpiece to form a composite member, employing a high frequency vibratory surface of extended length, comprising the steps of
   (a) supporting the elements with one end of said elements adapted to be inserted in said workpiece,
   (b) overlapping the ends of said elements and said workpiece at least in the region where the elements are to be inserted within the workpiece for joining the parts together to form the composite member,
   (c) inducing high frequency vibration of said entire vibratory surface of between approximately 1 kc./sec. and 100 kc./sec., said vibration having a substantial component of motion normal to said surface,
   (d) simultaneously establishing relative movement between the vibrating surface and composite member along a predetermined path defining a continually changing spacing of decreasing dimension between respective portions of said vibratory surface and composite member in a direction substantially normal to said path of travel, with said vibrating surface maintained in energy transferring relationship to one part of said composite member, and
   (e) simultaneously applying a static force to the other part of said composite member in a direction to urge said parts against the vibrating surface, whereby the elements are sequentially and gradually inserted into the workpiece recesses as said composite member and vibrating surface are moved relative to each other along said predetermined path.

2. The method as in claim 1; wherein said elements comprise a plurality of independent members.

3. The method as in claim 1; wherein said elements comprise contiguous segments of a single elongated member.

4. The method as in claim 1; wherein the vibratory surface is maintained fixed and the composite member moved relative thereto.

5. The method as in claim 1; wherein the composite member is maintained fixed and the vibratory surface moved relative thereto.

6. The method as in claim 1; wherein said predetermined path is linear and the angle between said predetermined path and said surface does not exceed sixty degrees.

7. The method as in claim 1; wherein said predetermined path is curved.

8. The method as in claim 1; further including the step of damping vibrations set up in said composite member during insertion.

9. The method as in claim 1; further including the step of maintaining said overlapping elements and workpiece in fixed relationship to each other prior to the application of said vibratory energy.

10. The method as in claim 1; wherein the vibratory energy is applied to the workpiece and the static force is applied to the elements.

11. The method as in claim 1; wherein the vibratory energy is applied to the elements and the static force is applied to the workpiece.

12. The method as in claim 1; wherein the extended length of said vibratory surface is in a direction parallel to the direction of relative movement between said vibratory surface and composite member.

13. The method as in claim 1; wherein the extended length of said vibratory surface is in a direction transverse to the direction of relative movement between said vibratory surface and composite member.

14. The method as in claim 1; further including the step of simultaneously imparting high frequency vibratory forces to the other part of said composite member.

15. Apparatus for inserting elements into the preformed recesses of a workpiece to form a composite member, comprising
(a) carrier means for supporting the elements and the workpiece forming the parts of the composite member in overlapping relationship to each other,
(b) vibrator means having a vibratory surface of extended length with a substantial component of vibratory motion normal to said surface,
(c) means for moving said vibratory means and carrier means relative to each other along a predetermined path defining a continually changing spacing of decreasing dimension between respective portions of said vibratory surface and composite member in the direction substantially normal to said path of travel, with said vibratory surface maintained in energy transferring relationship to one part of said composite member,
(d) means for simultaneously applying a static force to the other part of said composite member in a direction to urge said parts against the vibratory surface, and
(e) means for simultaneously generating high frequency vibrations in said vibrator means to act at said vibratory surface, and induce vibrations in the part of the composite member in energy transferring relation thereto, whereby the elements are sequentially and gradually inserted into the workpiece recesses as said composite member and vibratory surface are moved relative to each other.

16. Apparatus according to claim 15; wherein said means for moving said vibratory surface and carrier means relative to each other includes
(a) means for mounting said vibrator means in a fixed position, and
(b) drive means for effecting movement of said carrier means past said vibratory surface along said predetermined path.

17. Apparatus according to claim 15; wherein said means for moving said vibratory surface and carrier means relative to each other includes
(a) carriage means on which said carrier means is mounted, and
(b) drive means connected to said carriage means for moving said carriage means relative to said vibrator means.

18. Apparatus according to claim 15; wherein said means for applying a static force includes back-up means having a surface which confronts said vibratory surface, said back-up surface forming an inclined plane with respect to said vibratory surface, whereby a continuous clamping force is applied to the overlapping parts as the carrier means is moved relative to said vibratory surface.

19. Apparatus according to claim 18; wherein said back-up means and vibratory surface are maintained in fixed position with respect to each other and the composite member passed therebetween.

20. Apparatus as in claim 15; wherein said carrier means for supporting the elements is provided with a plurality of spaced apart apertures for receiving a portion of said elements therein.

21. Apparatus as in claim 15; further comprising means for damping out vibrations induced in said composite member during its exposure to the high frequency vibrations.

22. Apparatus as in claim 21; wherein the damping means includes
(a) a shoe having a surface for engaging a portion of said composite member,
(b) means for mounting said shoe along said predetermined path after the vibratory energy has been transmitted to said composite member, and
(c) means for applying a static force to urge said shoe surface against said composite member to dampen the vibrations.

23. Apparatus as in claim 15; wherein said carrier has a circular configuration, and further comprising means for feeding said elements onto said carrier on a continuous basis.

24. A method of inserting metallic-like elements into a plastic-like workpiece to form a composite member, employing a high frequency vibratory surface of extended length, comprising the steps of
(a) supporting the elements with one end of said elements adapted to be inserted in said workpiece,
(b) overlapping the ends of said elements and said workpiece at least in the region where the elements are to be inserted within the workpiece for joining the parts together to form the composite member,
(c) inducing high frequency vibration of said entire vibratory surface of between approximately 1 kc./sec. and 100 kc./sec., said vibration having a substantial component of motion normal to said surface,
(d) simultaneously establishing relative movement between the vibrating surface and composite member along a predetermined path defining a continually changing spacing of decreasing dimension between respective portions of said vibratory surface and composite member in a direction substantially normal to said path of travel, with said vibrating surface maintained in energy transferring relationship to one part of said composite member, and
(e) simultaneously applying a static force to the other part of said composite member in a direction to urge said parts against the vibrating surface, whereby the elements are sequentially and gradually inserted within the workpiece as said composite member and vibrating surface are moved relative to each other along said predetermined path.

25. Apparatus for inserting metallic-like elements into a plastic-like workpiece to form a composite member comprising
   (a) carrier means for supporting the elements and the workpiece forming the parts of the composite member in overlapping relationship to each other,
   (b) vibrator means having a vibratory surface of extended length with a substantial component of vibratory motion normal to said surface,
   (c) means for moving said vibratory means and carrier means relative to each other along a predetermined path defining a continually changing spacing of decreasing dimension between respective portions of said vibratory surface and composite member in the direction substantially normal to said path of travel, with said vibratory surface maintained in energy transferring relationship to one part of said composite member,
   (d) means for simultaneously applying a static force to the other part of said composite member in a direction to urge said parts against the vibratory surface, and
   (e) means for simultaneously generating high frequency vibrations in said vibrator means to act at said vibratory surface, and induce vibrations in the part of the composite member in energy transferring relation thereto, whereby the elements are sequentially and gradually inserted within the workpiece as said composite member and vibratory surface are moved relative to each other.

References Cited
UNITED STATES PATENTS

| | | | |
|---|---|---|---|
| 3,184,353 | 5/1965 | Balamuth et al. | 156—73 |
| 3,367,809 | 2/1968 | Soloff | 228—1 XR |

PHILIP DIER, Primary Examiner

U.S. Cl. X.R.

29—432, 470.1, 526; 156—297, 298, 306, 560, 580; 228—1; 264—23